United States Patent Office 3,551,278
Patented Dec. 29, 1970

3,551,278
METHOD OF PRODUCING IMPROVED SELF-CRIMPABLE CONJUGATE FILAMENTS, FROM POLYAMIDES AND POLYETHER-ESTERS
Fumimaro Ogata, Nishinomiya, and Katsuhiko Nagamine, Takatsuki, Japan, assignors to Kanegafuchi Boseki Kabushikikaisha, Tokyo, Japan and Snia Viscosa Società Nazionale Industria Applicazioni Viscosa S.p.S., Milan, Italy
No Drawing. Filed Jan. 2, 1968, Ser. No. 694,798
Claims priority, application Japan, Jan. 14, 1967, 42/2,823, 42/2,824
Int. Cl. D02g 3/00; C08g 41/04
U.S. Cl. 161—173
9 Claims

ABSTRACT OF THE DISCLOSURE

A method for the manufacture of self-crimpable filaments, wherein two components in side-by-side or in eccentric sheath-core relationship are conjugatedly spun through a common orifice. One component consists of a homopolyamide and the other consists of a mixture including from 50% to 97% the same or a similar polyamide and from 3% to 50% of an aromatic polyester-ether alone or combined with an aromatic polyester.

---

This invention is concerned with the manufacture of conjugate filaments obtained by melting two thermoplastic polymeric materials having different chemical and physical properties and conjugate spinning them in side-by-side or in eccentric sheath-core relationship through a common spinning orifice. More particularly, this invention is concerned with the manufacture of conjugate filaments as above, having from improved to excellent adhesive property, which do not separate after conjugate spinning, and possess very good crimpability, crimp elasticity and crimp recovering property for elongation.

It is well known in the art to provide filaments having spiraloid three dimensional crimps as in wool, by subjecting conjugate filamentary materials as above to a suitable shrinking processing. The provision of conjugate filaments, one component of which consists of a homopolyamide and the other component of a polymer having a high initial modulus, such as a polyester or an aromatic polyamide, has been heretofore known and representative of prior art.

However, when a homopolyamide and a polyester are conjugate spun, said two polymers are very poor in compatibility, and the resulting conjugate filaments are separated into the two components thereof in various steps after spun. Furthermore, when an aliphatic homopolyamide, such as nylon-6, nylon-66 and others, is conjugate spun with an aromatic copolyamide, the poor crystallinity and heat stability of the conjugate copolymer leads to too low tenacity and considerable deterioration against light and heat of the produced conjugate filamentary material.

More particularly, in the art wherein the polyamide is mixed only with polyester, the remarkable depolymerization of polyester component and coloration occur due to a vigorous reaction of the polyamide with the polyester, and further the melting point of polyester is generally high, so that defects, for example stickiness to the spinneret surface, yarn breakage, unevenness of fineness, unevenness of conjugate ratio, etc. are liable to be caused due to a considerable difference of viscosity between said two components when melt conjugate spinning and therefore such is not preferable.

However, the present invention solves the above described previous difficulties and provides a process of producing a self-crimpable conjugate filament having excellent adhesive property, conjugate spinnability, drawability, crimp elasticity as in wool, crimp recovering property for elongation and heat stability.

According to the invention, the improvement in the art of producing a two-component conjugate filamentary material wherein one component consists of an aliphatic homopolyamide and the other component of a polymeric mixture, comprises forming said polymeric mixture of from 50% to 97% by weight of said aliphatic polyamide and from 3% to 50% by weight of an aromatic polyester-ether alone or combined with an aromatic polyester, the ratio of said polyester-ether to said polyester being 100/0 to 3/97.

As polyamides used in the present invention, mention may be made of aliphatic series homopolyamides, such as, nylon-6, nylon-66, nylon-610 and nylon-11 or aliphatic series copolyamides in which said homopolyamide is copolymerized with a small amount of different polyamide, such as nylon-6/nylon-66, nylon-66/nylon-610, nylon-6/hexamethyleneterephthalamide(6T), nylon - 6/hexamethyleneisophthalamide(6I), nylon-6/metaxylyleneadipamide(MXD.6), etc.

As aromatic polyesters, mention may be made of polyalkylene terephthalate prepared by polycondensation of terephthalic acid or its lower alkyl ester such as dimethyl terephthalate, diethyl terephthalate, etc. with a polymethylene glycol having 2–8 methylene radicals in its main molecular chain. The most important such polyesters are polyethylene terephthalate and polyesters consisting mainly of polyethylene terephthalate which is copolymerized with a small amount of other polyester component.

As aromatic polyester-ethers, mention may be made of aromatic series polyester-ethers having ester linkage and ether linkage alternately in the main molecular chain of said polyester-ether, such as polyethylene oxybenzoate, polypropyleneoxybenzoate, polyethylene vanillate, polypropylene vanillate, etc.

The mixing ratio of the polyamide in said mixed polymer according to the present invention preferably from 50% to 97% by weight, more particularly from 60% to 90% by weight in view of melting point, viscosity, fluidity, adhesive property, drawability, etc. of both component polymers to be conjugate spun.

When said ratio is more than 97%, the conjugate filament is formed of substantially similar polyamides, so that it is difficult to obtain a self-crimpable conjugate filament having a desired crimp developability as in wool and the initial modulus is low, so that the crimp elasticity is insufficient. When the ratio of polyamide component in the mixed polymer is less than 50% and the content of other subcomponent(s) of the mixture, which have considerably different chemical and physical properties from polyamide, increases, the melting point and melt viscosity between the mixed polymer and the polyamide of the other component of the conjugate filament are remarkably different when conjugate spinning, so that it is difficult to obtain a conjugate filament having a desired quality and the adhesive property is poor, so that the conjugate filament is readily separated into two components in various steps after spun.

Considering the similarity between the viscosity of the above mentioned homopolyamide and that of the mixed polymer in conjugate spinning, and the drawability, dyeability and crimp developability of the resulting conjugate filament, the ratio of polyester-ether in the mixed polymer constituting the conjugate filament is preferable to be 3–50% by weight, more particularly 10%–40% by weight.

However, the higher the contents of the polyester-ether, the more the difference in melt viscosity between the mixed polymer and the homopolyamide to be used as one component increases, so that a conjugate filament having desired properties can hardly be obtained as stated hereinbefore. The property of the mixed polymer can be improved by further mixing polyesters therewith. Namely, a mixture of polyamide, polyester and polyester-ether is used as one component of the conjugate filament so that the melt viscosity of the mixed polymer is similar to that of polyamide of the other component of the conjugate filament when spinning. Moreover, if the polyester is copolymerized with the polyesterether in the mixed polymer, the melting point of the mixed polymer can be decreased and the conjugate spinnability and the drawing operation can be highly improved.

The mixing ratio of polyester to polyesterether in the mixed polymer can be varied depending upon the kind and the viscosity of polyamide to be employed in the mixed polymer and the polyamide to be used as one component in the conjugate spinning. Thus, the mixing ratio of polyester to polyesterether in the mixed polymer is 97:3–0:100 (by weight), preferably 95:5–5:95 (by weight).

When the mixing ratio of polyester to polyester-ether in the mixed polymer is beyond said range, the similar defects as described above to the case wherein only polyester or polyester-ether is mixed with polyamide, occur, so that such ratios are not preferable.

In general, as the amount of polyamide in the mixed polymer decreases, that is, as the amount of the mixture of the polyester-ether and the polyester increases, it is preferable that the ratio of the polyester-ether to the polyester approaches to 1. Reversely, as the amount of the polyamide increases, the said ratio can be varied within a broad range.

The mixing methods used in the present invention may be effected by previously mixing polyamide, polyester-ether and polyester, if required, polyamide and polyester/ polyester-ether copolymer or by a melt stirring mixer or by mixing these components directly when conjugate spinning.

The conjugate ratio of the polyamide component to the mixed polymer component of the conjugate filament according to the present invention can be suitably selected depending upon the purpose.

Any conjugate form of a side-by-side relation and an eccentric core and sheath relation can attain the object of the present invention.

Thus, according to the method of the invention, a homopolyamide is used as one component and a mixed polymer containing relatively large amounts of said homopolyamide is used as the other component, so that the resulting conjugate filament is superior to the conventional conjugate filament consisting of a homopolyamide and a copolyamide in the conjugate spinnability, and drawability, and further said filament has high crystallinity and heat resistance, so that the fatigue strength and the stabilities for light and heat are high. When the obtained conjugate filament is subjected to a shrinking treatment, such as swelling, wetting and heating, the filament develops excellent three-dimensional crimps. The crimped filament has such an excellent crimp elasticity, which has never been obtained in the conventional crimped filament. The thus obtained conjugate filament contains a polyester-ether having an excellent recovering property for elongation, so that said conjugate filament has stable crimps and an excellent crimp recovering property, by which the original crimped state can be recovered rapidly even after applying stresses, such as elongation, compression, etc. repeatedly. According to the inpention, the two components to be bonded, that is, the homopolyamide and the mixed polymer are excellent in the adhesive property and compatibilty, so that a conjugate filament can be easily produced by a conventional conjugate spinning apparatus.

Thus, according to the method of the invention, a conjugate filament having improved crimp elasticity and crimp recovering property for elongation, and further having a wool-like three-dimensional crimp developability can be easily produced, so that the conjugate filament can be used more midely for fabrics, knitted goods, carpets, interior ornaments, etc. than the conventional conjugate filament.

The invention will be explained in more detail with reference to the examples.

Curliness, crimp elasticity, crimp recovering property for elongation and crimp recovering property for compression described in the examples were determined as follows:

(1) Curliness: A bundle of 30 filaments having a length of 30 cm., is dipped in boiling water for 10 minutes under a load of 0.1 mg./d., and then air-dried under the same load. The curliness is shown by the percentage of apparent loss of the length calculated by the following equation.

$$\text{the curliness} = \frac{l_0 - l}{l_0} \times 100\%$$

wherein $l$ designates the length of the crimped filament and $l_0$ the original length of the filament.

(2) Crimp elasticity: The crimp elasticity is shown by the load (mg./d.) required for stretching the length of the crimped conjugate filament bundle obtained in paragraph (1) (under a load of 0.1 mg./d.) to 2 times.

(3) Crimp recovering percentage for elongation: The length of the filament, when the crimped conjugate filament bundle in the above paragraph (1) is applied a load of 0.2 mg./d., is $a$ and, the length, when a load of 0.1 g./d. is further added for one minute, is $b$ and then the length, 2 minutes after removed the load of 0.1 g./d., is $c$.

crimp recovering percentage for elongation (percent)

$$= \frac{b-c}{b-a} \times 100$$

(4) Crimp recovering percentage for compression: The crimped conjugate filaments obtained in the above paragraph (1) are cut into a length of 2 cm., 20 g. of which are introduced into a measuring cylinder having a diameter of 5 cm., and then a piston of 200 g. weight mounts on the crimped conjugate filaments and thereafter said measuring cylinder is subjected to a fine vibration and the equilibrium position of the piston is read (the height is $a$).

Then, a load of 600 g. is further applied to said piston and the equilibrium position of the piston is read in the same manner as described above (the height is $b$). Thereafter, only said load of 600 g. is removed whereby the position of the piston is recovered naturally and after 5 minutes the height is read (the height is $c$).

The crimp recovering percentage for compression is calculated by the equation as described in the above paragraph (3).

EXAMPLE 1

Nylon-6 having an intrinsic viscosity ($\eta$) of 1.24 in m-cresol at 30° C., and a mixed polymer having an intrinsic viscosity ($\eta$) of 1.31, which was obtained by melting and mixing said nylon-6 and polyethylene oxybenzoate having an intrinsic viscosity ($\eta$) of 0.65 in o-chlorophenol at 30° C. at the following mixture ratio, were melted and conjugate spun in a conjugate ratio of 1:1 (by weight) in a side-by-side type at 270° C. The resulting filament was hot drawn 4.4 times its original length on hot drawing rollers at 70° C. to obtain a conjugate filament of 15 deniers.

For the comparison, the above conjugate spinning was conducted under the same condition except that as one component to be bonded the above mentioned nylon-6 was used, and as the other component a copolyamide (copolymerization ratio, 40:60 by weight) having an intrinsic viscosity ($\eta$) of 0.98 in m-cresol, which was composed of nylon-6 and polyhexamethylene-terephthalamide, was used, and that as one component the above mentioned nylon-6 was used, and as the other component polyethylene terephthalate having an intrinsic viscosity ($\eta$) of 0.68 in o-chlorophenol was used.

The properties of the thus obtained conjugate filaments are shown in the following Table 1.

TABLE 1

| Experiment No. | Polymers to be conjugate spun with nylon-6 | Strength (g./d.) | Elongation (percent) | Initial modulus (g./d.) | Curliness (percent) | Crimp elasticity (mg./d.) | Crimp recovering percentage for elongation (percent) | Crimp recovering percentage for compression (percent) |
|---|---|---|---|---|---|---|---|---|
| 1 | Mixed polymer of 6/P.E.O.B.=97/3 | 6.3 | 26 | 21 | 47 | 7.1 | 72 | 66 |
| 2 | Mixed pllymer of 6/P.E.O.B.=95/5 | 6.3 | 25 | 25 | 51 | 8.9 | 87 | 72 |
| 3 | Mixed polymer of 6/P.E.O.B.=90/10 | 6.2 | 27 | 29 | 64 | 11.0 | 89 | 75 |
| 4 | Mixed polymer of 6/P.E.O.B.=70/30 | 5.9 | 27 | 38 | 73 | 13.1 | 94 | 79 |
| 5 | Mixed polymer of 6/P.E.O.B.=50/50 | 6.0 | 28 | 46 | 82 | 14.3 | 96 | 82 |
| 6 | Mixed polymer of 6/P.E.O.B.=40/60 | When the conjugate spun filament was hot drawn, it separated into two components, and a conjugate filament could not be obtained. | | | | | | |
| 7 | Copolyamide of 6/6T | 3.8 | 30 | 19 | 89 | 8.2 | 79 | 54 |
| 8 | P.E.T | When the conjugate spun filament was drawn, it separated into two components, and the measurements could not be effected. | | | | | | |

NOTE: In Table 1, P.E.O.B., 6, 6T and P.E.T. represent polyethylene oxybenzoate, nylon-6, polyhexamethyleneterephthalamide and polyethylene terephthalate respectively. The mixture ratio of 6 and P.E.O.B. in the mixed polymer of 6/P.E.O.B. is shown by weight.

The Experiments Nos. 3, 4 and 5 of Example 1 were repeated, except that polyethylene oxybenzoate was substituted by polyethylene vanillate and the similar results were obtained.

EXAMPLE 2

Nylon-6 having an intrinsic viscosity ($\eta$) of 0.98 in m-cresol at 30° C. and a mixed polymer of

6/P.E.O.B.=70/30 a copolyamide of 6/6T or a polyester used in Example 1 were conjugate spun in a conjugate ratio of 2:1 in a sheath and core type at a temperature of 280° C. respectively. The resulting filaments were hot drawn 4.2 times the original length on hot drawing rollers at 90° C. to obtain conjugate filaments of 15 deniers. The properties of the thus obtained conjugate filaments are shown in the following Table 2.

TABLE 2

| Experiment No. | Polymers to be conjugate spun with nylon-6 | Strength (g./d.) | Elongation (percent) | Initial modulus (g./d.) | Curliness (percent) | Crimp elasticity (mg./d.) | Crimp recovering percentage for elongation (percent) | Crimp recovering percentage for compression (percent) |
|---|---|---|---|---|---|---|---|---|
| 9 | Mixed polymer of 6/P.E.O.B. | 5.4 | 30 | 48 | 81 | 14.0 | 93 | 78 |
| 10 | Copolyamide of 6/6T | 4.0 | 34 | 26 | 84 | 9.8 | 81 | 56 |
| 11 | P.E.T | 5.1 | 33 | 68 | 85 | 18.1 | 59 | 85 |

EXAMPLE 3

The conjugate filaments in Experiment Nos. 1–11 (excluding Nos. 6 and 8) obtained in the Examples 1 and 2 were exposed to the light of fadeometer for 50 and 100 hours. The percentages of strength retention of the filaments are shown in the following Table 3.

TABLE 3

| Experiment No. | Percentage of strength retention | | |
|---|---|---|---|
| | Unexposed, percent | After exposure for 50 hours, percent | After exposure for 100 hours, percent |
| 1 | 100 | 79 | 51 |
| 2 | 100 | 82 | 56 |
| 3 | 100 | 84 | 58 |
| 4 | 100 | 85 | 58 |
| 5 | 100 | 87 | 61 |
| 7 | 100 | 73 | 47 |
| 9 | 100 | 83 | 58 |
| 10 | 100 | 75 | 49 |
| 11 | 100 | 89 | 68 |

EXAMPLE 4

Nylon-6 having an intrinsic viscosity ($\eta$) of 1.14 in m-cresol of 30° C. (hereinafter abridged as 6), was melt and stirred with a mixture of polyethylene terephthalate having an intrinsic viscosity ($\eta$) of 0.68 in o-chlorophenol at 30° C. (hereinafter abridged as P.E.T.) and polyethyleneoxybenzoate having an intrinsic viscosity ($\eta$) of 0.65 in o-chlorophenol at 30° C. (hereinafter abridged as P.E.O.B.) in a mixing ratio of 1:4 by weight, in the following mixing ratios at 270° C. for one hour to form a mixed polymer, which was melted and conjugate spun with the above nylon-6 in a side-by-side type at a temperature of 270° C. in a conjugate ratio of 1:1 (by weight) and the resulting filaments were hot drawn 4.2 times their original length on a hot drawing pin at 70° C. to obtain a conjugate monofilament of 15 deniers.

TABLE 4

| Experiment No. | Composition of the mixed polymer 6/P.E.T.+ P.E.O.B. | Viscosity of the mixed polymer | Spinnability | Drawability | Tenacity (g./d.) | Elongation (percent) | Initial modulus (g./d.) | Curliness (percent) | Crimp elasticity (mg./d.) | Crimp recovering percentage for elongation (percent) | Crimp recovering percentage for compression (percent) |
|---|---|---|---|---|---|---|---|---|---|---|---|
| 12 | 97/3 | 1.13 | Good | Good | 5.6 | 28 | 21 | 31 | 6.7 | 90 | 61 |
| 13 | 95/5 | 1.15 | do | do | 5.7 | 29 | 26 | 56 | 9.6 | 96 | 70 |
| 14 | 90/10 | 1.16 | do | do | 5.8 | 31 | 35 | 78 | 13.4 | 95 | 80 |
| 15 | 70/30 | 1.25 | do | do | 5.6 | 29 | 38 | 83 | 15.1 | 96 | 83 |
| 16 | 50/50 | 1.38 | do | (¹) | 5.4 | 24 | 45 | 89 | 17.3 | 96 | 87 |
| 17 | 45/55 | 1.48 | (²) | | | | | | | | |
| 18 | 40/60 | 1.57 | do | | | | | | | | |

¹ Yarn breakage occurs slightly.
² Impossible.

NOTE: The viscosity shows an intrinsic viscosity measured in m-cresol at 30° C.

The Experiments Nos. 12, 14 and 16 of Example 4 were repeated, except that polyethylene terephthalate was substituted by polypropylene terephthalate and the similar results were obtained.

EXAMPLE 5

80 percent by weight of nylon-6 used in Example 4 was melted and mixed with 20% by weight of a mixture of the following mixing ratios of P.E.T. and P.E.O.B. by means of an extruder having a diameter of 20 mm. to form a mixed polymer, which was conjugate spun with nylon-6 of the same viscosity as that of the mixed polymer and hot drawn in the same manner as described in Example 4 to obtain a monofilament of 15 deniers.

The obtained results are shown in Table 5.

TABLE 5

| Experiment No. | P.E.T./ P.E.O.B. weight ratio | Viscosity of the mixed polymer | Tenacity (g./d.) | Elongation (percent) | Initial modulus (g./d.) | Curliness (percent) | Crimp elasticity (mg./d.) | Crimp recovering percentage for elongation (percent) | Crimp recovering percentage for compression (percent) |
|---|---|---|---|---|---|---|---|---|---|
| 19 | 0/20 | 1.49 | 5.3 | 31 | 27 | 68 | 10.2 | 96 | 71 |
| 20 | 1/19 | 1.35 | 5.3 | 31 | 29 | 76 | 10.7 | 96 | 72 |
| 21 | 4/16 | 1.31 | 5.6 | 29 | 34 | 81 | 11.2 | 96 | 75 |
| 22 | 8/12 | 1.24 | 5.8 | 28 | 36 | 79 | 12.1 | 95 | 78 |
| 23 | 12/8 | 1.17 | 5.8 | 30 | 39 | 78 | 13.0 | 92 | 82 |
| 24 | 16/4 | 1.01 | 5.7 | 30 | 41 | 76 | 13.8 | 91 | 86 |
| 25 | 19/1 | 0.88 | 5.6 | 31 | 45 | 76 | 14.8 | 90 | 90 |
| 26 | 20/0 | 0.54 | The viscosity is low, so that the spinning is impossible. | | | | | | |

Furthermore, in the production of said mixed polymer, the polyester/polyester-ether copolymer previously copolymerized P.E.T. with P.E.O.B. was mixed with nylon-6 to form a mixed polymer, which was conjugate spun in the same manner as described above to obtain the similar results to those described above.

EXAMPLE 6

The mixed polymer used in Experiment No. 12 of Example 4 and nylon-66 having an intrinsic viscosity of 0.98 in m-cresol at 30° C. were melted and conjugate spun in a conjugate ratio (by weight) of 1:2 at the temperature of 280° C. in such a manner that nylon-66 was arranged in the sheath portion and said mixed polymer was eccentrically arranged in the core portion, and the resulting filament was hot drawn 4.1 times its original length on a hot drawing pin at 80° C. to obtain a monofilament of 15 deniers.

Said filaments had a tenacity of 5.6 g./d., an elongation of 29% and an initial modulus of 38 g./d. Furthermore, this filament had a curliness of 77%, a crimp elasticity of 14 mg./d., a crimp recovering percentage for elongation of 96% and a crimp recovering percentage for compression of 83%.

What is claimed is:

1. A two component conjugate filamentary material comprising (a) a first component nylon aliphatic homopolyamide; and (b) a second component copolymeric mixture comprising (i) a first sub-component nylon aliphatic homopolyamide; and (ii) a second sub-component which is either an aromatic polyester-ether or a mixture of an aromatic polyester-ether and an aromatic polyester, the ratio of polyester-ether to polyester of said mixture being from 100:0 to 3:97 and the said first sub-component (i) constituting 50% to 97% by weight of said copolymeric mixture and said second sub-component (ii) constituting 3% to 50% by weight of said copolymeric mixture, and wherein said aromatic polyester is the polycondensation product of terephthalic acid or lower alkyl ester thereof and an alkylene glycol of 2 to 8 carbon atoms in the alkylene group; and said aromatic polyester-ether is a polyalkylene oxybenzoate or vanillate, the alkylene group containing 2 or 3 carbon atoms.

2. The filamentary material of claim 1, wherein said aliphatic homopolyamide in the polymeric mixture is from 60% to 90% by weight.

3. The filamentary material of claim 1, wherein each of the aromatic polyester-ether and aromatic polyester of said mixture comprising the said second sub-component (ii) comprises at least 10% of said mixture.

4. The filamentary material of claim 1, wherein the polyester-polyether is polyethylene oxybenzoate.

5. The filamentary material of claim 1, wherein said nylon polyamide is nylon-6.

6. The filamentary material of claim 1, wherein said aromatic polyester-ether combined with the aromatic polyester is a copolymer of said polyester-ether and said polyester.

7. The filamentary material of claim 5, wherein the component (b) comprises 70–95% by weight nylon-6 and 5% to 30% by weight of a mixture of polyethylene terepthalate and polyethylene oxybenzoate, the ratio of terephthalate to benzoate being 0/20 to 19/1 by weight.

8. The filamentary material of claim 1, wherein said ratio is 1/4.

9. The filamentary material of claim 5, wherein the nylon-6 comprises about 80% by weight of the second component (b).

References Cited
UNITED STATES PATENTS

| | | | |
|---|---|---|---|
| 3,288,755 | 11/1966 | Griehl | 260—47 |
| 3,291,778 | 12/1966 | Korematsu | 260—47 |
| 3,345,331 | 10/1967 | Reese | 260—47 |
| 3,363,027 | 1/1968 | Schnegg | 260—857 |

PAUL LIEBERMAN, Primary Examiner

U.S. Cl. X.R.

260—47, 75, 78, 857; 161—175, 177; 264—171, 174